United States Patent
Conti

(10) Patent No.: US 7,095,997 B2
(45) Date of Patent: Aug. 22, 2006

(54) DIRECT-CONVERSION RECEIVER FOR A COMMUNICATION SYSTEM USING A MODULATION WITH NON-CONSTANT ENVELOPE

(75) Inventor: Patrick Conti, Saint Jean de Tholome (FR)

(73) Assignee: STMicroelectronics N.V., Amsterdam (NL)

( * ) Notice: Subject to any disclaimer, the term of this patent is extended or adjusted under 35 U.S.C. 154(b) by 589 days.

(21) Appl. No.: 10/281,052

(22) Filed: Oct. 25, 2002

(65) Prior Publication Data

US 2003/0087625 A1    May 8, 2003

(30) Foreign Application Priority Data

Oct. 26, 2001   (EP)  ................................. 01125321

(51) Int. Cl.
*H04B 1/10*    (2006.01)
(52) U.S. Cl. ..................... 455/317; 455/310; 455/311; 375/322
(58) Field of Classification Search ................ 455/317, 455/310, 311, 324, 295, 296; 375/322, 133, 375/281

See application file for complete search history.

(56) References Cited

U.S. PATENT DOCUMENTS

| | | | |
|---|---|---|---|
| 5,749,051 A | 5/1998 | Dent | 455/324 |
| 6,144,243 A | 11/2000 | Väisänen | 327/307 |
| 6,535,725 B1* | 3/2003 | Hatcher et al. | 455/317 |
| 2002/0160734 A1* | 10/2002 | Li et al. | 455/245.1 |
| 2003/0078011 A1* | 4/2003 | Cheng et al. | 455/73 |
| 2004/0072547 A1* | 4/2004 | Axness et al. | 455/130 |
| 2005/0070240 A1* | 3/2005 | Adler et al. | 455/232.1 |

FOREIGN PATENT DOCUMENTS

| | | |
|---|---|---|
| EP | 0806841 | 11/1997 |
| EP | 0840484 | 5/1998 |

* cited by examiner

*Primary Examiner*—Matthew Anderson
*Assistant Examiner*—Sanh D. Phu
(74) *Attorney, Agent, or Firm*—Lisa K. Jorgenson; Allen, Dyer, Doppelt, Milbrath & Gilchrist, P.A.

(57) ABSTRACT

A direct-conversion receiver includes an analog stage for receiving an incident signal from a transmission channel, mixers and programmable-gain amplifiers. The receiver further includes at least one compensation module having input and output terminals respectively connected between the output of the mixers and the input of the programmable-gain amplifiers. The compensation module compensates for both a static DC voltage offset and a possible dynamic DC voltage offset of the analog stage.

29 Claims, 2 Drawing Sheets

DIRECT-CONVERSION RECEIVER FOR A COMMUNICATION SYSTEM USING A MODULATION WITH NON-CONSTANT ENVELOPE

FIELD OF THE INVENTION

The present invention relates in general to wireless communication systems, and in particular, to CDMA systems.

BACKGROUND OF THE INVENTION

In a wireless communication system, a base station communicates with a plurality of remote terminals, such as cellular mobile telephones. Frequency division multiple access (FDMA) and time division multiple access (TDMA) are the traditional multiple access schemes for delivering simultaneous services to a number of terminals. The basic idea underlying FDMA and TDMA systems is based upon sharing the available resource, respectively as several frequencies or as several time intervals, so that several terminals can operate simultaneously without causing interference.

Telephones operating according to the GSM standard belong to the FDMA and TDMA systems in the sense that transmission and reception are performed at different frequencies and also at different time intervals. Moreover, a GSM signal is a phase-modulated signal which has a constant envelope. Stated otherwise, the amplitude of the modulation is constant.

In contrast to these systems using frequency division or time division, the CDMA (Code Division Multiple Access) systems allow multiple users to share a common frequency and a common time channel by using coded modulation. Among the CDMA systems, mention may be made of the CDMA 2000 system, the WCDMA system (Wide Band CDMA) or the IS-95 standard.

In CDMA systems, a scrambling code is associated with each base station making it possible to distinguish one base station from another. Furthermore, an orthogonal code, known as an OVSF code, is allotted to each remote terminal. The remote terminal may be a cellular mobile telephone, for example. All the OVSF codes are mutually orthogonal, thus making it possible to distinguish one remote terminal from another.

Before sending a signal over the transmission channel to a remote terminal, the signal has been scrambled and spread by the base station using the scrambling code of the base station and the OVSF code of the remote terminal. In CDMA systems, it is again possible to distinguish between those which use a distinct frequency for transmission and reception (CDMA-FDD system), and those which use a common frequency for transmission and reception but with distinct time domains (CDMA-TDD system).

In contrast to communication systems having a constant-envelope modulation, like the GSM system, CDMA systems use a modulated signal which has a non-constant envelope. Stated otherwise, such a signal is phase-modulated and amplitude-modulated, and the amplitude of the modulation is not constant.

In a terminal of a wireless communication system, the direct conversion or transposition to a zero intermediate frequency is an alternative to a superheterodyne architecture. This is especially well suited for very highly integrated architectural terminal configurations.

A direct-conversion receiver, i.e., a receiver with a zero intermediate frequency (zero-IF receiver), converts the band of the useful signal directly around the zero frequency (baseband) instead of converting it to an intermediate frequency on the order of a few hundred MHz.

A direct-conversion receiver is the most beneficial radio frequency architecture, not only because it makes it possible to obtain very high levels of integration by reducing the number of external components, but also for its capability of permitting multistandard receptions. Such an architecture unfortunately exhibits some drawbacks, such as a DC voltage offset and second-order distortion.

Two different types of DC voltage offsets have to be considered, namely a static or temporally unvarying offset, and a temporally varying or dynamic offset. The static offset is due to matching errors in the method of manufacturing the receiver, while the dynamic offset stems mainly from the non-linear characteristics and from leakages between the inputs of the mixers of the receiver.

Also, this voltage offset added to the transposed signal may be significant enough to saturate the high-gain amplification stages. This causes a loss of information, thereby appreciably increasing the bit error rate (BER). All the approaches to this problem which have been developed for constant-envelope modulations, such as in GSM systems for example, are not suitable for systems using modulation with a non-constant envelope, such as in CDMA-FDD systems for example.

SUMMARY OF THE INVENTION

In view of the foregoing background, an object of the present invention is to reduce within a direct-conversion receiver static and dynamic DC voltage offsets, with the reduction being done at high speed and continuously. The invention relates in general to communication systems using modulation with a non-constant envelope, and advantageously applies to communication systems of the CDMA type, and more especially, to systems of the CDMA-FDD type.

Another object of the present invention is to reduce the number of external components of the direct-conversion receiver to obtain a high level of integration that is structurally independent of the digital stage of the receiver. The receiver is preferably compatible with the majority of existing terminals.

These and other objects, advantages and features in accordance with the present invention are provided by a direct-conversion receiver for a communication system using modulation with a non-constant envelope. The direct-conversion receiver comprises an analog stage for receiving an incident signal of a transmission channel, transposition means and programmable-gain amplification means.

According to a general characteristic of the invention, the receiver furthermore comprises at least one compensation module having an input terminal and an output terminal connected between the output of the transposition means and the input of the amplification means. The compensation module compensates for both a static DC voltage offset and a possible dynamic DC voltage offset of the analog stage.

According to one embodiment of the invention, the compensation module comprises first means for determining the envelope of the AC component of the signal present at the input terminal of the module, second means for determining the envelope of the signal present at the input terminal of the module, and first subtraction means connected to the output of the first means and to the output of the second means. A sample-and-hold circuit is connected to the output of the first subtraction means. The compensation module also comprises second subtraction means forming the output terminal of the module, and has a first input connected to the transposition means and a second input connected to the output of the sample-and-hold circuit.

The first means advantageously comprise a high-pass filter whose cut-off frequency lies between a quarter of the frequency of the modulation, and a half of the same frequency. Thus, when the frequency of the modulation is equal to 3.84 MHz, it will, for example, be possible to choose a high-pass filter whose cut-off frequency is on the order of 1.5 MHz.

The analog stage may further comprise low-pass filtering means downstream of the transposition means. The input terminal of the compensation module is then preferably downstream of the low-pass filtering means, thereby making it possible to eliminate the high-frequency spurious sources and to improve the evaluation of the DC offset voltage.

The analog stage preferably comprises two processing pathways for processing quadrature signals. The quadrature signals are I and Q signals according to the nomenclature that is well known to the person skilled in the art. Although it is possible to use two compensation modules connected respectively to the two processing pathways, it is possible to configure the receiver so that it comprises just a single compensation module whose input terminal is connected to one of the processing pathways, and whose output terminal is connected to each of the processing pathways. Specifically, the matching of the various radio frequency blocks of the receiver is relatively good on the silicon wafer.

The subject of the invention is also directed to a remote terminal of a communication system using modulation with a non-constant envelope, such as a cellular mobile telephone comprising a receiver as defined above.

The invention also provides a method for processing an incident signal within a direct-conversion receiver for a communication system using modulation with a non-constant envelope. The method comprises reception of the incident signal from a transmission channel, a frequency transposition of the signal and a programmable-gain amplification of the transposed signal.

According to a general characteristic of the invention, a compensation signal representative of a static DC voltage offset and a possible dynamic DC voltage offset of the analog stage is preferably formulated from a signal tapped off after the transposition. This compensation signal is subtracted before amplification from the signal emanating from the transposed signal.

According to an implementation of the invention, formulation of the compensation signal comprises a determination of the envelope of the AC component of the signal tapped off, a determination of the envelope of the signal tapped off, a subtraction between the two envelopes, and a sampling-and-holding of the subtracted signal.

Determination of the envelope of the AC component of the signal tapped off advantageously comprises a high-pass filtering whose cut-off frequency lies between a quarter of the frequency of the modulation and a half of the frequency of the modulation. Moreover, the compensation signal is preferably formulated from the signal tapped off after a low-pass filtering that is performed after the transposition. Furthermore, the compensation signal may be formulated from a signal tapped off from just one of the processing pathways of the receiver, and then it is delivered to both processing pathways.

BRIEF DESCRIPTION OF THE DRAWINGS

Other advantages and characteristics of the invention will become apparent on examining the detailed description of modes of implementation and embodiments, which are in no way limiting, and the appended drawings, in which.

DETAILED DESCRIPTION OF THE PREFERRED EMBODIMENTS

Figure 1:
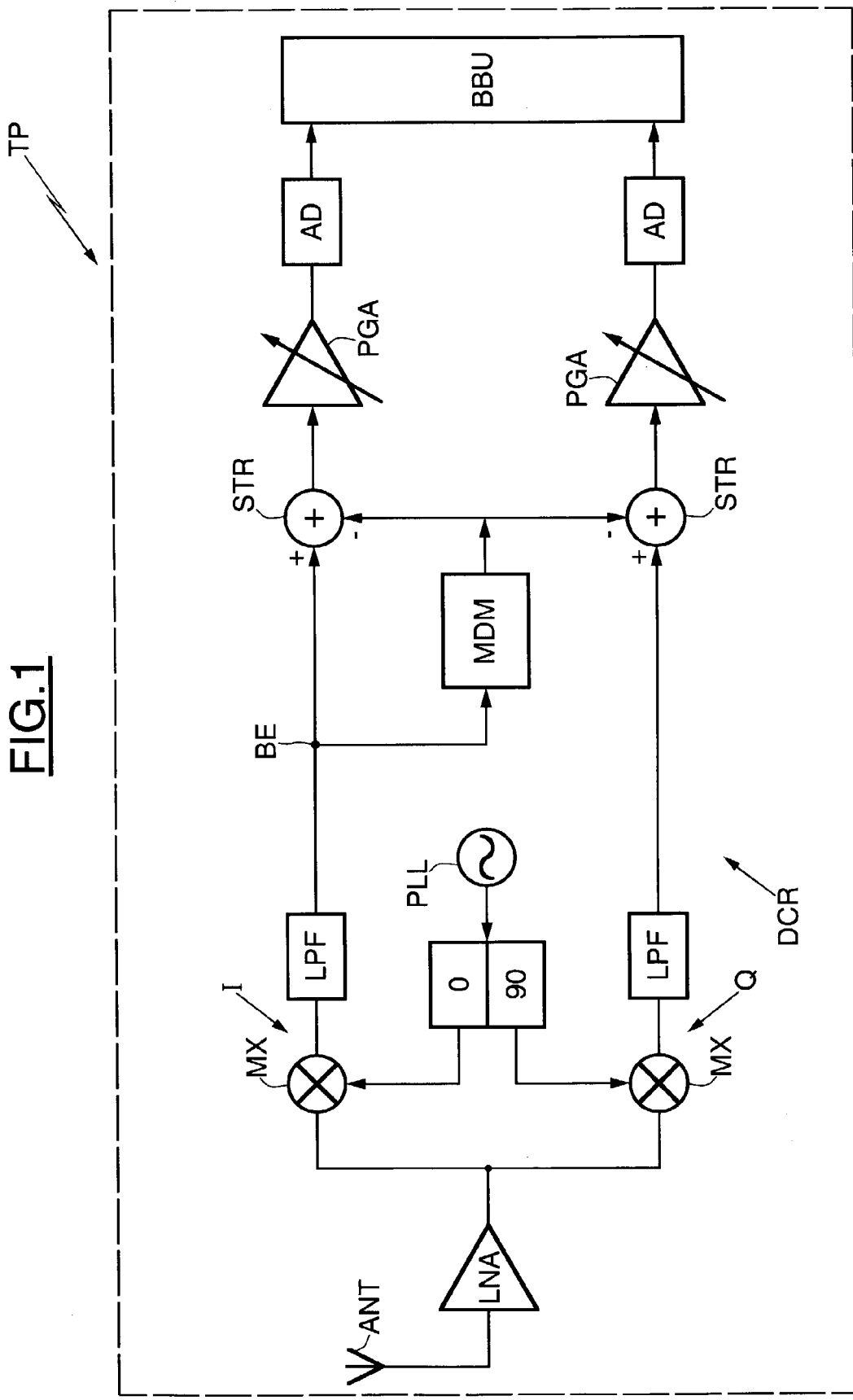
FIG. 1 diagrammatically illustrates a receiver according to the present invention.

In FIG. 1, the reference TP designates a remote terminal such as a cellular mobile telephone which is in communication with a base station. The cellular telephone TP comprises a direct-conversion receiver DCR connected to an antenna ANT for receiving an incident signal emanating from a transmission channel.

The direct-conversion receiver DCR comprises an analog stage connected to a digital stage. The digital stage is also referred to as a baseband processing unit BBU, and is connected across a pair of illustrated analog digital conversion stages AD. Conventionally, the analog stage comprises a low noise amplifier LNA and two processing pathways respectively including a mixer MX (transposition means), a conventional low-pass filter LPF and a programmable-gain amplifier PGA.

The two mixers MX respectively receive from a phase-locked loop PLL two signals mutually exhibiting a phase difference of 90 degrees. After frequency transposition in the mixers, the two processing pathways respectively define two streams I and Q according to nomenclature well known to the person skilled in the art. Since the receiver is a direct-conversion receiver, the signal received is transposed to baseband and then filtered and amplified in baseband.

After digital conversion in the converters AD, the two digital streams I and Q are delivered to the digital processing stage BBU. The digital processing stage BBU is well known to the person skilled in the art and comprises, in particular, channel estimation means or circuitry, demodulation means or circuitry and source decoding means or circuitry. Moreover, the programmable gain of the amplifiers PGA is controlled by the digital processing stage.

According to this embodiment of the invention, the receiver DCR furthermore comprises a compensation module including a block MDM and a subtractor STR connected to each processing pathway upstream of a corresponding amplifier PGA. Moreover, while the subtractor STR forms the output terminal of the compensation module, the input terminal BE of this compensation module is situated on the processing pathway I upstream of the low-pass filter LPF that is after the mixer MX.

Figure 2:
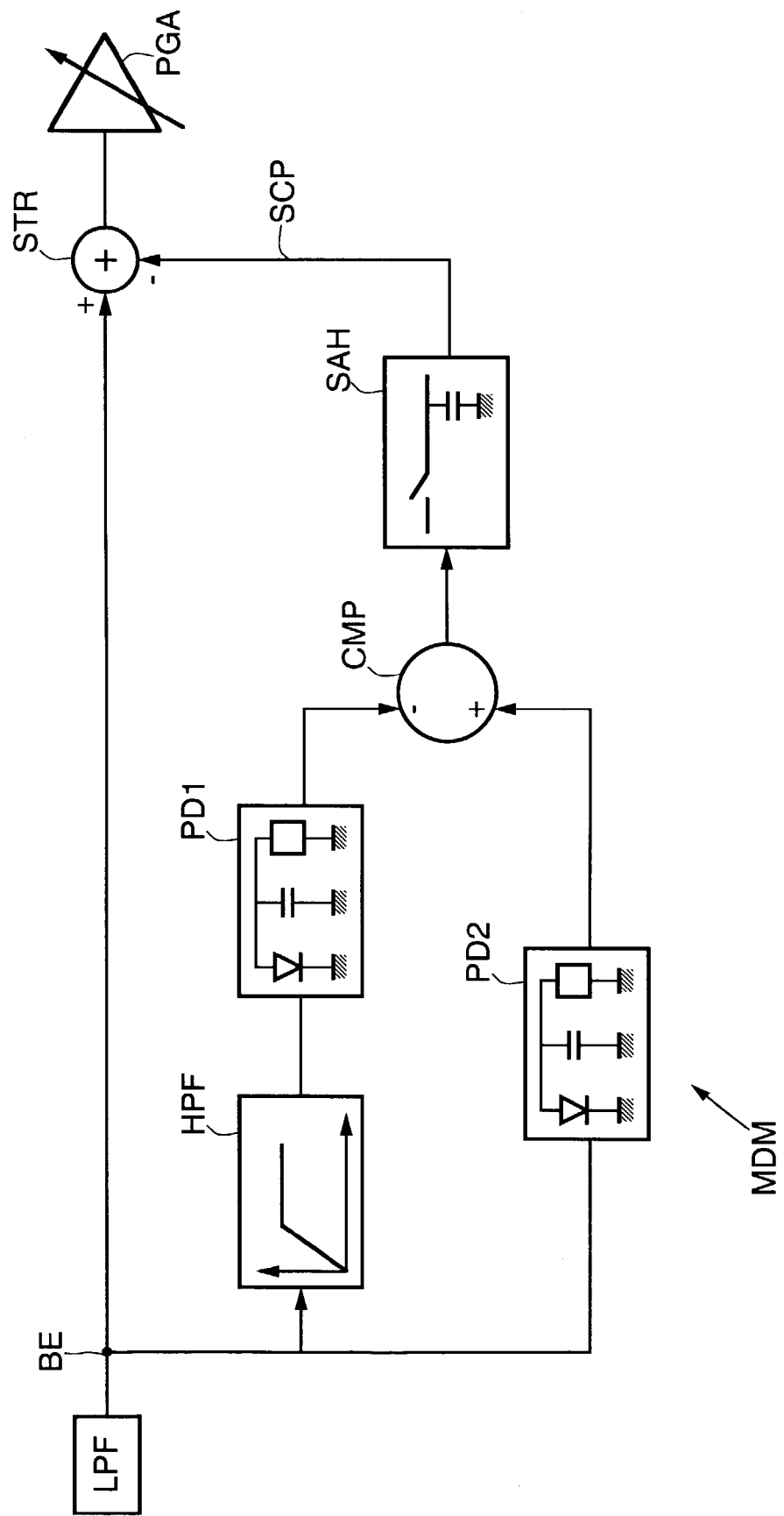
FIG. 2 diagrammatically illustrates in greater detail the compensation module illustrated in FIG. 1.

As illustrated in FIG. 2, the block MDM comprises a high-pass filter HPF whose cut-off frequency advantageously lies between a quarter of the frequency of the modulation and a half of the frequency of the modulation. Thus, it will be possible to choose a cut-off frequency of 1.5 MHz for a CMDA-FDD system, for example, whose frequency of modulation is equal to 3.84 MHz. The input of this high-pass filter HPF is linked to the input terminal BE of the compensation module, and is connected just after the low-pass filter LPF. The low-pass filter eliminates the high-frequency spurious sources, and thus promotes the estimation of the DC voltage offset, and consequently, its elimination.

At the output of the filter HPF, all the DC information has been removed from the modulated signal present at the input terminal BE. The high-pass filter HPF is followed by a peak detector PD1 having a conventional structure that is readily known by those skilled in the art. The peak detector determines the envelope of the AC component of the signal tapped off at the input terminal BE. The peak detector has a droop rate tailored to the chip rate of the signal.

Before transmission via the antenna of the base station, the initial signal containing the (symbol) information is scrambled and spread by the processing means or processor of the base station by using the scrambling code of the base station and the orthogonal code (OVSF) of the telephone TP. Consequently, the symbols are transformed into fragments (otherwise known as chips) having a predetermined length (e.g., equal to 260 nanoseconds) and corresponding to a predetermined chip rate equal to 3.84 Mcps, for example, for the WCDMA-FDD standard.

Thus, the chip rate is greater than the symbol rate. A symbol can be transformed into a number of chips ranging from 4 to 256. In the illustrated example, for a chip rate equal to 3.84 Mcps, a droop rate equal to 10 mV/2 µs will be chosen for the peak detector PD1.

The block MDM further comprises another peak detector PD2 connected directly to the input terminal BE for determining the envelope of the signal tapped off at the input terminal BE. A first subtractor CMP subtracts the signal arising from the peak detector PD1 from the signal arising from the peak detector PD2, and therefore delivers an output signal representative of the DC offset voltage of the analog stage, regardless of whether the offset voltage is static or dynamic.

A sample-and-hold circuit SAH of conventional structure maintains the information extracted from the subtractor CMP at a frequency determined by a clock signal CLK. The clock signal CLK can be produced continuously or activated under specific conditions, such as when the high-order bit of the digital converter AD is active, for example. Stated otherwise, the information arising from the sample-and-hold circuit SAH can only be refreshed at chosen instants.

The frequency of the clock signal CLK is chosen as a function of the chip rate. Thus, for a chip rate of 266 nanoseconds, it will be possible to choose a period for the clock signal on the order of 10 microseconds. In the case where refreshes are carried out at chosen instants, the clock signal CLK can include trains of closely spaced pulses.

The presence of the sample-and-hold circuit SAH makes it possible, in particular, to suppress the noise resulting from the detection of the envelopes of the various signals, and to avoid any loss of information of the low-frequency modulation. The compensation signal SCP delivered by the sample-and-hold circuit SAH is then subtracted in the subtractor STR from the signal emanating directly from the low-pass filter LPF. At the output of the subtractor STR, the signal is consequently void of any DC voltage offset.

The invention claimed is:

1. A direct-conversion receiver for a communication system using modulation having a non-constant envelope, the direct-conversion receiver comprising:
  an analog stage for receiving a signal from a transmission channel, said analog stage comprising
    transposition means for transposing the signal to a baseband signal,
    at least one compensation module connected to said transposition means for compensating the baseband signal for static and dynamic DC voltage offsets within said analog stage, and
    programable-gain amplification means connected to said at least one compensation module for amplifying the compensated baseband signal;
  wherein said at least one compensation module further comprises
    an input terminal and an output terminal,
    first means connected to the input terminal for determining an envelope of an AC component of the baseband signal,
    second means connected to the input terminal for determining an envelope of the baseband signal,
    first subtraction means having a first input connected to an output of said first means, and a second input connected to an output of said second means, and
    second subtraction means having a first input connected to the input terminal, a second input connected to an output of said first subtraction means, and an output connected to the output terminal.

2. A direct-conversion receiver according to claim 1, wherein said at least one compensation module further comprises:
  a sample-and-bold circuit connected between an output of said first subtraction means and the second input of the second subtraction means.

3. A direct-conversion receiver according to claim 2, wherein said first means comprise a high-pass filter having a cut-off frequency between a quarter of a frequency of the modulation and a half of the frequency of the modulation.

4. A direct-conversion receiver according to claim 1, wherein said analog stage further comprises a low-pass filter connected between said transposition means and said at least one compensation module.

5. A direct-conversion receiver according to claim 1, wherein said analog stage comprises two processing paths; and wherein said at least one compensation module comprises a single compensation module having an input connected to one of the two processing paths and an output connected to each of the two processing paths.

6. A direct-conversion receiver according to claim 1, wherein the direct-conversion receiver is within a mobile terminal.

7. A direct-conversion receiver according to claim 6, wherein the mobile terminal comprises a cellular telephone.

8. A direct conversion receiver comprising:
  an input for receiving a signal modulated with a non-constant envelope;
  at least one mixer connected to the input for transposing the signal to a baseband signal;
  at least one compensation module connected to said at least one mixer for compensating the baseband signal for a DC voltage offset; and
  at least one amplifier connected to said at least one compensation module for amplifying the compensated baseband signal;
  wherein said at least one compensation module comprises
    an input terminal and an output terminal,
    a first envelope detector circuit connected to the input terminal for determining an envelope of an AC component of the baseband signal,
    a second envelope detector circuit connected to the input terminal for determining an envelope of the baseband signal,
    a first subtraction circuit having a first input connected to an output of said first envelope detector circuit, and a second input connected to an output of said second envelope detector circuit, and a second subtraction circuit having a first input connected to the input terminal, a second input connected to an output of said first subtraction circuit, and an output connected to the output terminal.

9. A direct-conversion receiver according to claim 8, wherein the DC voltage offset comprises at least one of a static DC voltage offset and a dynamic DC voltage offset.

10. A direct-conversion receiver according to claim 8, wherein said at least one amplifier comprises a programmable-gain amplifier.

11. A direct-conversion receiver according to claim 8, wherein said at least one compensation module further comprises:
a sample-and-hold circuit connected between an output of said first subtraction circuit and the second input of the second subtraction circuit.

12. A direct-conversion receiver according to claim 11, wherein said first envelope detector circuit comprises a high-pass filter having a cut-off frequency between a quarter of a frequency of the modulation and a half of the frequency of the modulation.

13. A direct-conversion receiver according to claim 8, wherein said analog stage further comprises a low-pass filter connected between said at least one mixer and said at least one compensation module.

14. A direct-conversion receiver according to claim 8, wherein said at least one mixer comprises a pair of mixers; wherein said at least one amplifier comprises a pair of amplifiers; wherein there is a processing path between each respective mixer and amplifier; and wherein said at least one compensation module comprises a single compensation module having an input connected to one of the two processing paths and an output connected to both of the processing paths.

15. A direct-conversion receiver according to claim 8, wherein the direct-conversion receiver is within a mobile terminal.

16. A direct-conversion receiver according to claim 15, wherein the mobile terminal is a cellular telephone.

17. A mobile terminal comprising;
an input for receiving a signal modulated with a non-constant envelope;
an analog stage connected to the input and comprising
at least one mixer for transposing the signal to a baseband signal;
at least one compensation module connected to said at least one mixer for compensating the baseband signal for a DC voltage offset, and
at least one amplifier connected to said at least one compensation module for amplifying the compensated baseband signal; and
a digital stage connected to said analog stage for processing the compensated baseband signal;
wherein said at least one compensation module comprises
an input terminal and an output terminal,
a first envelope detector circuit connected to the input terminal for determining an envelope of an AC component of the baseband signal,
a second envelope detector circuit connected to the input terminal for determining an envelope of the baseband signal,
a first subtraction circuit having a first input connected to an output of said first envelope detector circuit, and a second input connected to an output of said second envelope detector circuit, and
a second subtraction circuit having a first input connected to the input terminal, a second input connected to an output of said first subtraction circuit, and an output forming the output terminal.

18. A mobile terminal according to claim 17, wherein the DC voltage offset comprises at least one of a static DC voltage offset and a dynamic DC voltage offset.

19. A mobile terminal according to claim 17, wherein said at least one compensation module further comprises:
a sample-and-hold circuit connected between an output of said first subtraction circuit and the second input of the second subtraction circuit.

20. A mobile terminal according to claim 19, wherein said first envelope detector circuit comprises a high-pass filter having a cut-off frequency between a quarter of a frequency of the modulation and a half of the frequency of the modulation.

21. A mobile terminal according to claim 17, wherein said analog stage further comprises a low-pass filter connected between said at least one mixer and said at least one compensation module.

22. A mobile terminal according to claim 17, wherein said at least one mixer comprises a pair of misers; wherein said at least one amplifier comprises a pair at amplifiers; wherein there is a processing path between each respective mixer and amplifier; and wherein said at least one compensation module comprises a single compensation module having an input connected to one of the processing paths and an output connected to both of the processing paths.

23. A method for processing a signal in a direct-conversion receiver, the method comprising:
receiving the signal after having been modulated with a non-constant envelope;
transposing the signal to a baseband signal;
generating a compensation signal representative of a DC voltage offset within the direct-conversion receiver; and
subtracting the compensation signal from the baseband signal;
wherein generating the compensation signal comprises
determining an envelope of an AC component of the baseband signal;
determining an envelope of the baseband signal, and subtracting the envelope of the AC component of the baseband signal from the envelope of the baseband signal.

24. A method according to claim 23, wherein the DC voltage offset comprises at least one of a static DC voltage offset and a dynamic DC voltage offset.

25. A method according to claim 23, wherein determining the envelope of the baseband signal is performed using a first envelope detector circuit comprising a high-pass filter having a cut-off frequency between a quarter of a frequency of the modulation and a half of the frequency of the modulation.

26. A method according to claim 23, further comprising a low-pass filtering of the baseband signal before generating the compensation signal.

27. A method according to claim 23, wherein the direct-conversion receiver includes two processing paths; and wherein generating the compensation signal is based the baseband signal on one of processing paths with the compensation signal being delivered to both of the processing paths.

28. A method according to claim 23, wherein the direct-conversion receiver is within a mobile terminal.

29. A method according to claim 28, wherein the mobile terminal comprises a cellular telephone.

* * * * *

UNITED STATES PATENT AND TRADEMARK OFFICE
CERTIFICATE OF CORRECTION

PATENT NO. : 7,095,997 B2  Page 1 of 1
APPLICATION NO. : 10/281052
DATED : August 22, 2006
INVENTOR(S) : Patrick Conti It is certified that error appears in the above-identified patent and that said Letters Patent is hereby corrected as shown below:

Column 6, Line 22    Delete: "sample-and-bold"

Insert: -- sample-and-hold --

Column 8, Line 21    Delete: "misers"

Insert: -- mixers --

Signed and Sealed this

Twenty-seventh Day of March, 2007

JON W. DUDAS
*Director of the United States Patent and Trademark Office*